Feb. 17, 1925.

S. C. McKEOWN ET AL 1,526,754

MACHINE FOR FORMING PLATES AND ATTACHING SAME TO THE WICKS OF CANDLES

Filed April 12, 1923  9 Sheets-Sheet 3

Fig. 3.

Inventors
S. C. McKeown
F. H. Shackleton
By their Attorney

Feb. 17, 1925.  
S. C. McKEOWN ET AL  
1,526,754  
MACHINE FOR FORMING PLATES AND ATTACHING SAME TO THE WICKS OF CANDLES  
Filed April 12, 1923  
9 Sheets-Sheet 4

Inventors  
S.C. McKeown  
F. H. Shackleton  
By their Attorney

Feb. 17, 1925.  
S. C. McKEOWN ET AL  
1,526,754  
MACHINE FOR FORMING PLATES AND ATTACHING SAME TO THE WICKS OF CANDLES  
Filed April 12, 1923  9 Sheets-Sheet 5

Inventors  
S. C. McKeown  
F. H. Shackleton  
By their Attorney

Feb. 17, 1925.                                                          1,526,754
S. C. McKEOWN ET AL
MACHINE FOR FORMING PLATES AND ATTACHING SAME TO THE WICKS OF CANDLES
Filed April 12, 1923                9 Sheets-Sheet 6

INVENTORS
S. C. McKeown
F. H. Shackleton
BY
ATTORNEY

Feb. 17, 1925.  
S. C. McKEOWN ET AL  
1,526,754  
MACHINE FOR FORMING PLATES AND ATTACHING SAME TO THE WICKS OF CANDLES  
Filed April 12, 1923  9 Sheets-Sheet 8

INVENTORS  
S. C. McKeown  
E. H. Shackleton  
BY  
ATTORNEY

Patented Feb. 17, 1925.

1,526,754

UNITED STATES PATENT OFFICE.

SAMUEL C. McKEOWN, OF EAST ORANGE, NEW JERSEY, AND FRED H. SHACKLETON, OF AQUEDUCT, NEW YORK, ASSIGNORS, BY MESNE ASSIGNMENTS, TO DIAMOND CANDLE COMPANY, INC., OF BROOKLYN, NEW YORK, A CORPORATION OF NEW YORK.

MACHINE FOR FORMING PLATES AND ATTACHING SAME TO THE WICKS OF CANDLES.

Application filed April 12, 1923. Serial No. 631,573.

*To all whom it may concern:*

Be it known that we, SAMUEL C. McKEOWN, a citizen of the United States, and a resident of East Orange, in the county of Essex and State of New Jersey, and FRED H. SHACKLETON, a subject of the King of Great Britain, and a resident of Aqueduct, in the county of Queens and State of New York, have invented a new and Improved Machine for Forming Plates and Attaching Same to the Wicks of Candles, of which the following is a full, clear, and exact description.

In the manufacture of church candles, it is customary to form the candle with a central opening; a wick is passed through this opening and attached to a securing base plate. The base plate has teeth thereon which are embedded in the base of the candle to hold the wick securely in place.

The invention which forms the subject matter of this application relates to a machine entirely automatic in operation, which will form the plates from lengths of strip stock which will cut the wicks in the proper length and attach the plates to the wicks.

The principal object of the invention is to provide an automatic machine for performing the above mentioned functions and to do away with the antiquated methods now commonly employed in manufacture of church candles and other candles.

Further objects of the invention are the provision of a machine which will be comparatively simple in construction, rapid in operation, durable and efficient in use, and comparatively inexpensive to install and operate.

With these and other objects in view, the invention consists in certain novel features of construction and combinations and arrangements of parts which will be more fully hereinafter described and pointed out in the claims.

The accompanying drawings are to be understood as illustrative only of one of the preferred means for carrying out the invention. In the drawings—

*General assembly.—(Fig. 1.)*

Figure 1:
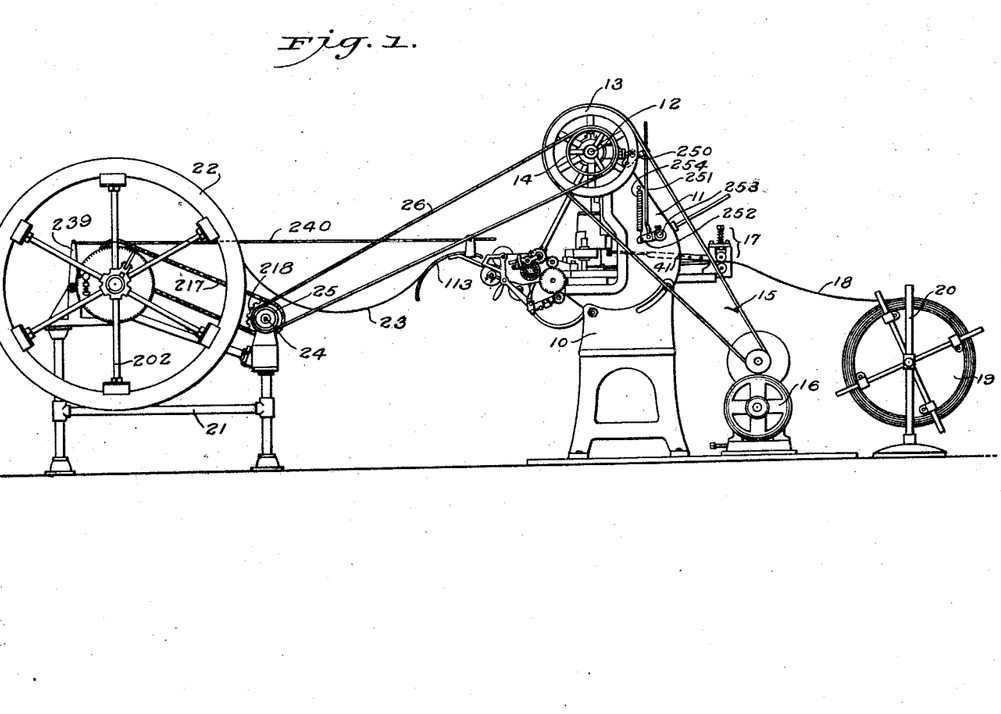
Figure 1 is a view in side elevation of my improved machine showing the relation of the strip stock reel, the wick stock reel and the motor to the main forming and assembling mechanism.

Before entering with particularity upon a detailed description of the various parts of our improved machine, we shall indicate roughly the general arrangement of the units which co-operate to form the general assembly. The numeral 10 indicates a suitable base upon which a punch press 11 is supported. 12 designates the drive shaft of the press upon which are borne a relatively large and a relatively small pulley 13 and 14. The larger pulley is driven through a suitable power transmitting device, such as the belt 15 from any appropriate type of motor 16. A strip feeding mechanism indicated generally at 17 and supported upon the rear end of the press serves to feed a pair of strips of relatively thin metal stock 18 from a reel or reels 19. This stock is used in forming the base plates for the candles and the reel or reels which carry it are loosely journalled in suitable bearings in an upright frame 20.

The skeleton frame 21 which provides mounting for the reels 22 which have wound thereabout the wick stock indicated at 23 provides mounting for a counter shaft 24 upon which a pulley 25 is borne. Power is transmitted to the counter shaft 24 through the medium of a power transmitting device such as 26, preferably in the nature of a belt connecting the pulleys 14 and 25. The means for transmitting power from the counter shaft 24 to drive the reels 22 will be later described in detail.

Figure 9:
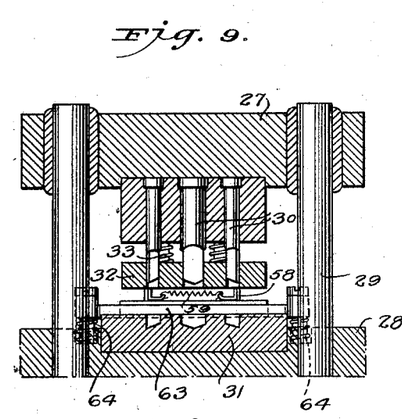
Fig. 9 is a transverse section through dies on the line 9—9 of Fig. 4.

*Punch press.—(Figs. 2 and 9.)*

The frame of the punch press (see Fig. 2) provides mounting for the usual reciprocating plunger 27 which co-operates with a platen 28. The plunger is guided in its reciprocating movement by vertical guide rods 29 and carries on its under face male punching dies 30 (see Fig. 9) which co-operate with female dies 31 supported on the platen of the press. A stripper 32 spring held as indicated at 33 from the lower face of the plunger normally conceals the working ends of the dies 30. This stripper is checked by its engagement with the platen on the descending movement of the plunger and the dies move therethrough into co-acting relationship with the female die member. It serves to strip stock from the dies, should the same have any tendency to stick thereto, and holds strip down to prevent buckling during forming of the piece.

*Strip stock feeding mechanism.—(Fig. 2.)*

Figure 2:
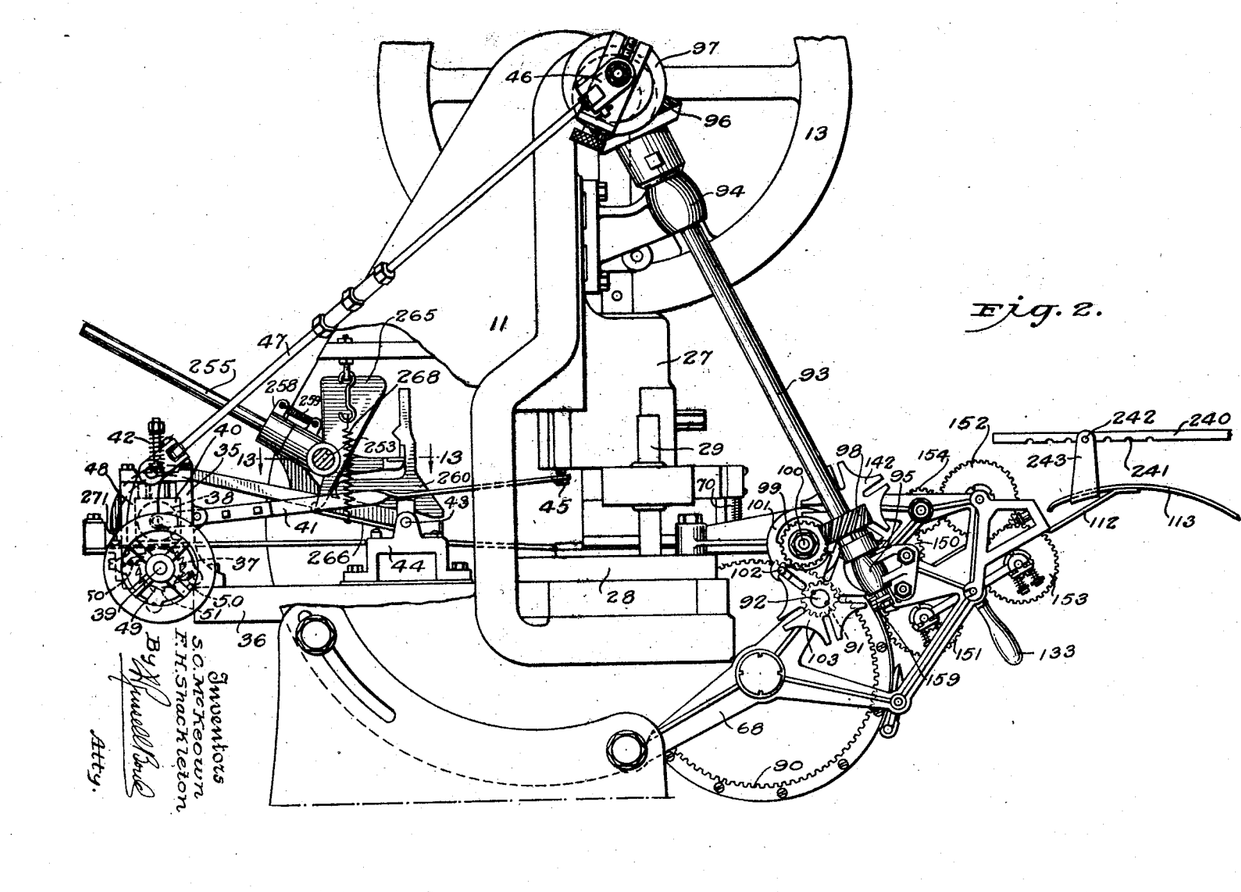
Fig. 2 is an enlarged view in side elevation of the punch press and its associated mechanism.

The mechanism for unwinding the strip stock from the reels 19 and feeding the same between the platen and plunger of the punch press is more or less conventional, but may be briefly described for the sake of clearness. The mechanism is mounted in a bracket 35 bolted or otherwise suitably secured to the rear end of the table 36 of the press. It comprises a pair of co-operating rollers 37, 38, the first of which is mounted in fixed position on an arbor 39 having bearings in the bracket 35. The other roller 38 is a pressure roller and is yieldingly mounted in bearings 40 at one end of a lever 41. The bearings 40 are in the form of blocks vertically slidable in the bracket 35 and normally urged by springs 42 to maintain the roller 38 against the stock which is located between the two rollers. Turning of the roller 37 will operate to feed the stock only when the roller 38 is pressed tightly against it as will be readily understood. If roller 38 be in elevated position, slippage will occur. In order to prevent friction of the upper roller upon the stock while the punch press is in descended position, the lever 41 is attached to the roller 38 and its position regulated by the position of the press plunger. The lever 41 is fulcrumed intermediate its ends in the bracket 35. One end of this lever extends under the heel of the press plunger and carries adjusting screw 45. The plunger acting on this screw serves to elevate the pressure roller 38 whenever the plunger has reached a predetermined point in its downward movement. It is a difficult matter to feed an exact length of stock at each operation of the press but by virtue of the above described construction the stock may be pulled either backwardly or forwardly by the centering pins 32' (see Fig. 4) on each descent of the plunger. These taper pins engage in previously punched holes in the stock to shift the same one way or the other, thereby correcting any inaccuracies of the feeding mechanism. Positive turning of the roller 37 to effect the feeding of stock may be accomplished in a conventional manner. The mechanism which we have shown consists of a crank arm 46 adjustable on the main drive shaft 12 of the press. A connecting rod 47 connects the crank arm 46 to a projecting lug 48 integral with a plate 49 swivelled on the arbor 39. This plate carries pawls 50 engageable with the teeth of a ratchet 51 secured to the roller 37. Oscillation of the plate 49 thus serves to effect intermittent feeding of the strip stock 18, the feeding occurring while the press plunger is in elevated position.

*Plate forming and severing mechanism.—(Figs. 3 and 4.)*

Figure 10:
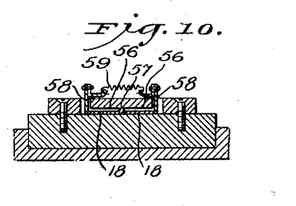
Fig. 10 is a view in transverse section on the line 10—10 of Fig. 4 showing the means for guiding and aligning the strip stock.

The two strips of stock as they are fed through the stock feeding mechanism just described are caused to pass through a pair of channelled guide members 55 serving to direct the stock toward the dies. Immediately after leaving these guide members and just before their introduction under the press, the strips are passed through other guide ways 56 (see Fig. 10) and pushed against a central partition 57 dividing these guideways or channels, by spring actuated plates 58. Preferably the plates are urged toward each other by a spring 59. They serve to effect the desired relation of the two strips of stock 18, so that they will be properly aligned with the dies when they pass under the press.

Figure 11:
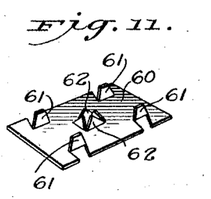
Fig. 11 is a perspective view of a base plate formed by the machine.

It is not deemed necessary to enter into details of the shape or arrangement of the punching dies which are used for forming the plates. One of the plates is shown in Fig. 11 where it will be seen that it is of substantially rectangular shape. The plate indicated at 60 has an up-struck tongue 61 adjacent each corner and is provided with a central opening therethrough which is formed by striking up in the plate four substantially triangular tongues 62. In the manufacture of candles, the candle wick is crimped or clamped by depressing the tongues 62 after the end of the wick has been passed through the central opening. The tongues 61 are embedded in the base of the candle to securely hold the wick in proper position. The candles may if desired be molded on the wick and plate. As a general rule, they are formed with central openings therethrough and the wick and plate are subsequently attached. Attention is called to the yieldingly mounted risers or followers 63 (Figs. 3, 4 and 9) in the form of transverse bars arranged in the female die member and urged upwardly by springs 64. One of these risers elevates the stock just before it is initially punched by the rearmost punching die and the other follower elevates it out of the grooves in the female die member just before the plate severing operation occurs. The plates are severed from the strip by a shearing knife 65 secured to the block which carries the male dies and co-operating with the sharp forward corner 66 (Fig. 4) of the female die.

*Tamper.—(Figs. 3 and 4.)*

The plates having been cut from the strip are automatically placed upon a plate carrying drum 67 having mounting in a pair of skeleton side frame plates 68 extending forwardly from the press frame 26. In order to insure the proper placing of the plates upon the drum, we provide a pair of tampers 69 carried by the press plunger. Springs 70' afford yielding mounting for these tampers in the plunger of the press. Vertical movement of the tampers incidental to movement of the press plunger is guided by a frame 70 pivoted as indicated at 71 between the frame members 68. Pivotal movement of the frame 70 is ordinarily prevented by a pair of spring pressed dogs indicated in dotted lines at 72 (Fig. 4) which lock in the frame plates 68, and which may be manually retracted from their locked position when it becomes desirable to swing the frame 70 upwardly and remove undersized or defective plates which may have dropped upon the drum 67.

*Plate carrying drum and its driving mechanism.—(Figs. 2, 3, 4, 4ª and 7.)*

The drum 67 is provided with a laterally extending hub 75 (Fig. 7) which turns freely in a bearing 76 formed in one of the frame plates 68. The rim 77 of the drum cooperates with a concentric internal annular web 78 to provide mounting for two annular series of radially disposed tappets 79. These tappets are hollow as indicated at 80. Springs 81 around the tappets between the rim of the drum and collars 82 on the tappets serve to retain the same in retracted position. Openings 83 are provided throughout the rim or periphery of the drum and the tappets are adapted to be projected through these openings when it becomes desirable to perform the crimping operation on the plates. It will be noted that as the plates are dropped upon the drum, the openings 83 serve to accommodate the tongues 62 of the plates. Suitable grooves indicated at 84 (Fig. 4) accommodate the tongues 61 of the plates so that the plates are firmly held against sliding movement on the drum. After the plate has been deposited on the drum, and just before the drum starts to move to carry the plate around, the tamper 69 comes into operation, yieldingly holding the plate against the surface of the drum and co-operating with the frame 70 to guide the same under an arcuate guard plate 85 which prevents the plates from falling off the drum as they are being carried. This guard plate is formed with two pairs of openings 86 and 87. One pair of these openings is to permit the insertion of the candle wicks through the guard plate and through the plate 60 and into the hollow tappets, as will be later described, and the other pair of openings 87 provides clearance for anvils 88 which co-operates with the tappets in crimping the tongues 62 upon the wicks. This mechanism will also be more fully described hereinafter.

A ring gear 90 secured to the exterior face of the drum 67 is intermittently driven by a pinion 91 (Fig. 2) having bearings on a stub shaft 92 in frame plate 68 which provides mounting for the drum. The mechanism for imparting intermittent motion to the pinion 91 is seen most clearly in Fig. 2. A diagonally disposed drive shaft 93 having bearings at 94 and 95 in the press frame and in one of the side plates 68 respectively carries at its upper end a bevelled gear 96 meshing with a similar gear 97 on the driving shaft 12 of the press. A helical gear 98 carried by the shaft 93 adjacent its lower end meshes with a helical gear 99 borne by a stub shaft 100 having bearings in one of the side frame plates 68, Fixed to this shaft 100 is a plate 101 from which projects laterally a pin 102. This pin co-acts with a Geneva gear 103 on the stub shaft 92 to intermittently drive the pinion 91 and to effect a consequent step by step movement of the drum. In other words, the drum is moved during each descent of the press plunger 27 to bring the inner pair of tappets 79 into position to receive a pair of plates as they are severed from the strip.

*Wick feeding mechanism.*—(*Figs. 2, 3, 4, 5, 6, and 8.*)

Figure 3:
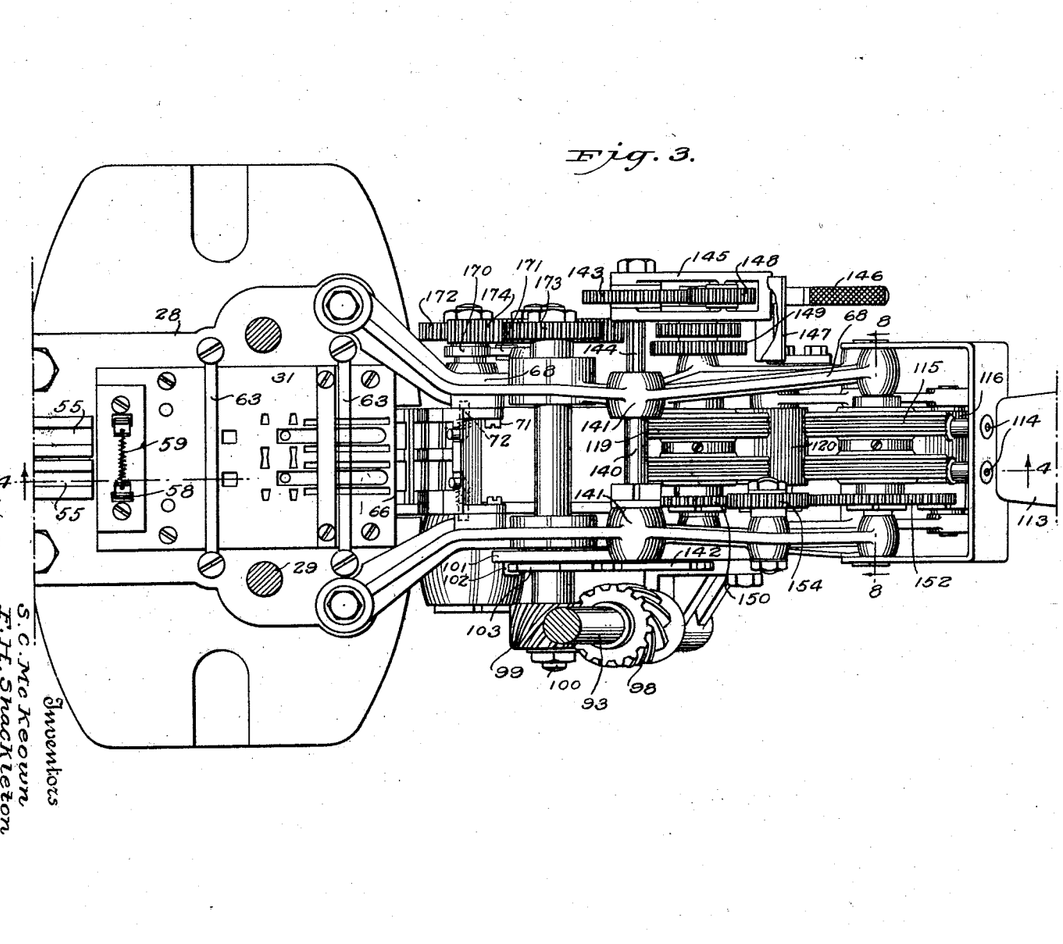
Fig. 3 is a sectional plan view of the mechanism shown in Figs. 2 and 4 taken on the line 3—3 of Fig. 4.
Figure 8:
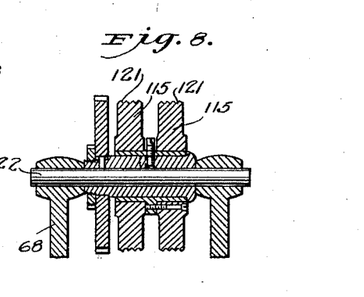
Fig. 8 is a transverse sectional detail view on the line 8—8 of Fig. 3.

A bracket 105 is formed with arms 106 which straddle and are pivotally secured to the upper outer ends of the side frame members 68 as indicated at 107. Depending legs 108 on this bracket include angularly offset bifurcated extensions 109 at their lower ends which receive the projecting ends of trunnions 110 which rockingly support a frame 111 (see Fig. 6) in suitable bearings of the main side frames 68. As seen most clearly in Fig. 5 the bracket 105 is normally rigidly supported upon the frame work of the machine, but may be swung upwardly if desired. This bracket is formed with a forwardly presented extension 112 which provides mounting for an arcuate plate 113. The plate 113 guides the wick stock as it comes from the reels 22. Tubular nipples 114 secured to the bracket 105 and extending inwardly therefrom guide the wick stock into position to be fed between the outer pair of feed rollers. We have designated the two upper feed rollers of this outer pair by the reference numeral 115 and the lower pressure roller by the numeral 116. Passing between these rolls the wick stock is fed through elongated tubular guides 117 secured upon a cross bar 118 of the frame work (see Fig. 4) into position to be grasped and fed by the second pair of feed rollers. We have indicated the upper one of this latter pair of rollers at 119 and the lower pressure rollers at 120. With particular reference to Fig. 8 and Fig. 3, it will be noted that the rollers 115 and 119 are formed with peripheral grooves 121 which receive the wick stock. These grooves are of various sizes to accommodate wick stock of various diameters. The upper pairs of rollers 115 and 119 are permanently mounted in the frames 68 upon cross shafts 122, 123.

Figure 6:
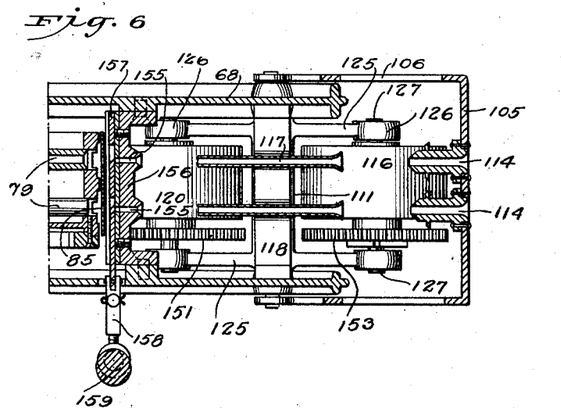
Fig. 6 is a longitudinal sectional view on the line 6—6 of Fig. 4.
Figure 7:
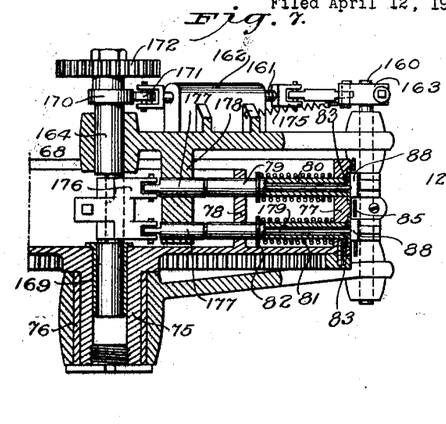
Fig. 7 is a sectional view on the line 7—7 of Fig. 4.

In order to facilitate the initial insertion of the wick stock between the pairs of rollers and its positioning in the proper grooves 121, the lower pair of pressure rollers preferably have mounting in the rocking frame 111 (see Fig. 6). This frame includes pairs of oppositely extending arms 125 formed with bearings 126 at their ends wherein the spindles or trunnions 127 of the rollers 116 and 120 are free to turn. As seen most clearly in Fig. 5, the bearings 126 are sectional bearings, one section of which is integral with the arms 125 of the rocking frame 111. The other sections of these bearings are in the form of plates 130 sliding on posts 131 secured to the opposite bearing sections and impelled by springs 132 into complemental relation with such sections. By virtue of this construction, it is possible to rock the frame 111 in either direction, one or another pair of plates 130 yielding and sliding on their associated posts. For the purpose of rocking the frame, a handle 133 is provided. This handle is rigidly attached to the frame 111 and may be swung in either direction to effect the relative separation of the rollers 115, 116 or the rollers 119, 120 as may be desired.

It is desirable that the wick stock be fed at periodic intervals. Its feeding must occur while the drum 67 is stationary so that the wicks may be passed through the plates 60 and cut off before the drum is moved another step. The mechanism for effecting such intermittent feed of the wick stock is shown most clearly in Figs. 2, 3 and 5. While it is not absolutely essential to the success of the machine, it is highly desirable that some means should be provided for regulating or varying the length of wick stock which is fed upon each movement of the feed rollers. We accomplish this result by the provision of a variable speed mechanism as a part of the drive for such rollers. Referring to Fig. 3 of the drawings, it will be seen that a transverse shaft 140 having bearings 141 in the side frame plates 68 carries at one end a Geneva gear 142 similar to the Geneva gear which drives the drum. The driving gear 143 is also borne by the opposite end of this shaft. As the pin 102 passes out of the slot of the Geneva gear 103 after partially rotating the same it enters directly into a slot of the gear 142 and rotates this gear through a partial revolution. In other words, as soon as the drum has come to rest the wick feeding mechanism starts to operate. The drive from the gear 143 to the shaft 123 of the driving rollers 119 is through a change speed mechanism. Gear 143 is keyed to slide in a keyway 144 on the shaft 140 (Fig. 3) and is disposed between the arms of a yoke 145 which has pivotal mounting on the end of this shaft and is also slidable thereon. This yoke carries a handle member 146 which may be locked in any one of a series of notches (not shown) in a rack or sector bar 147 projecting laterally from the side of the machine. A pinion 148 journalled on a stub shaft within the yoke 145 is in mesh with the gear 143 and lateral sliding of the yoke operates to bring this pinion selectively into engagement with any one of a number of gear wheels 149 mounted on the shaft 123. In other words, the throw of the feed rollers for the wick stock may be regulated by selecting the particular sized gear 149 with which the pinion 148 is to be thrown in mesh. The opposite end of the shaft 123 carries a gear 150 (see Fig. 2) meshing with a gear 151 on the roller 120. Intermeshing gears 152, 153 are likewise carried by the feed rollers 115 and 116 and are driven from the gear 153 through the intermediacy of a pinion 154.

*Wick severing mechanism.—(Figs. 2 and 6.)*

The wick stock having passed between the rollers 119 and 120 is guided through passages 155 in a block 156 secured between the frame plates 68, through the openings 86 in the guard plate 85, through the central openings in the candle plates 60 and into the interior of the hollow tappets 79. A block 156 provides sliding mounting for a shearing knife 157 laterally reciprocable to sever the desired length of wick from the wick stock after the major portion of the same has been fed into the tappets in the drum. Any suitable mechanism may of course be devised for operating the knife 157. By way of illustration, we have shown the knife connected to a link 158 which has its outer end swivelled on an eccentric 159 carried adjacent the extreme lower end of the diagonal driving shaft 93. Rotation of the drive shaft 93 will thus effect severing of the wicks after each wick feeding operation has been completed and before movement of the drum 67 again takes place.

*Crimping mechanism.—(Figs. 4, 5, and 7.)*

Figures 4, 4A:
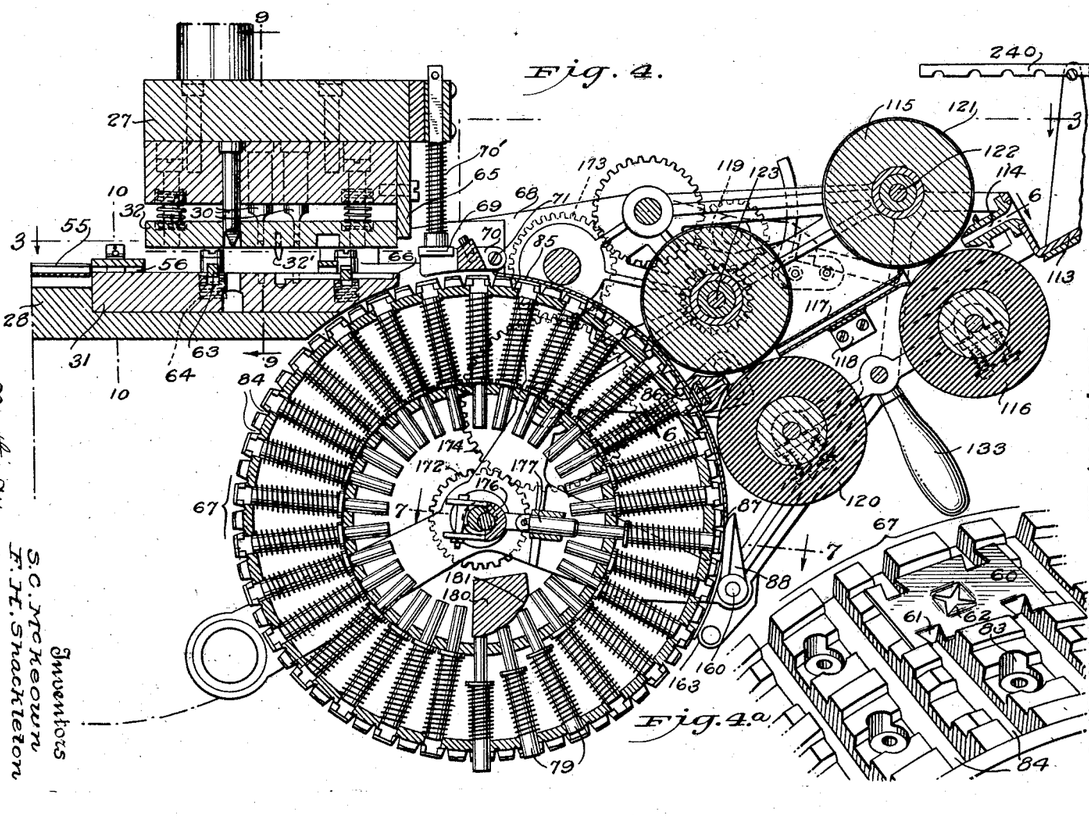
Fig. 4 is a longitudinal sectional view taken on the line 4—4 of Fig. 3, Fig. 4ᵃ is a fragmentary perspective view showing the grooved surface of the plate drum.
Figure 5:
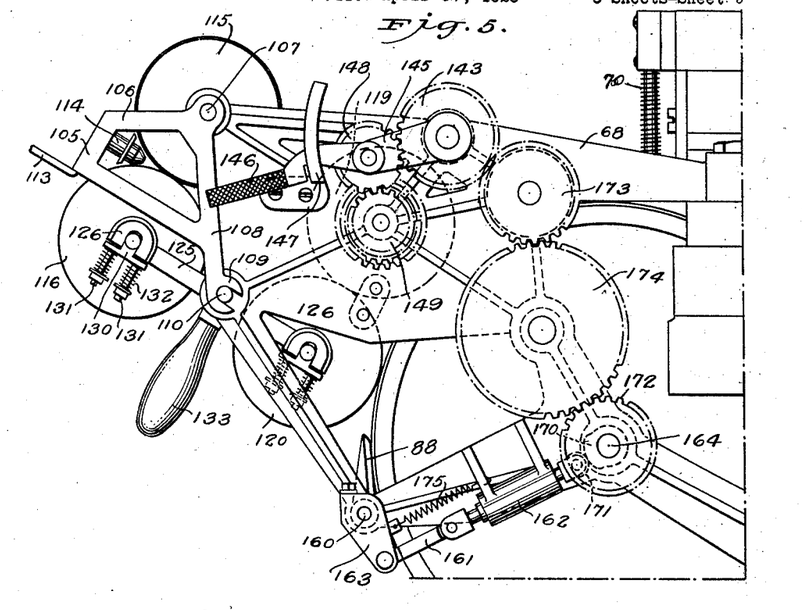
Fig. 5 is a side elevation of the opposite side of the machine from that shown in Fig. 2.

The wick having been cut off and lying mainly within the tappet but having an end extending through the opening in the candle plate 60 and the drum 67 continuing to be intermittently rotated, the tappets carrying the wick and plate are brought into position in front of the openings 87 in the guard 85 (see Fig. 4). It is while the plates are at this point and while the drum is stationary that the wick crimping operation occurs; the anvils 88 co-operating with a pair of tappets 79 to upset the tongues 62 of the plates 60 and clamp the wicks in place. The anvils 88 are swung upwardly at the same time that the tappets 79 are projected radially outwardly. The anvils are fixedly mounted on a cross shaft 160 journalled in the lower portions of the main frames 68. A push bar 161 having a sliding bearing in a bearing bracket 162 secured to the machine frame is operatively connected to a crank arm 163 fixed to the shaft 160. The manner of reciprocating the push bar 161 to swing the anvils upwardly appears most clearly in Figs. 5 and 7. A shaft 164 having a bearing in one end of one of the side frames 68 and a bearing at its other end in the bushing 169 whereon the hub 75 of the drum 67 rotates, carries a cam 170 intermittently engageable with a roller 171 at the end of the push bar 161. A pinion 172 borne by the end of the shaft 164 is driven from a pinion 173 on the shaft 100 through the intermediacy of a relatively large gear 174. The cam 170 pushes the bar 161 to positively turn the crank arm 163 and swing the anvils 88 upwardly. As the roller 171 rotates off the cam 170, return movement of the push bar is effected by a spring 175 (see Fig. 5). Radial projection of the tappets is coincidental with the upward swinging of the anvils and is effected by an eccentric 176 secured to the shaft 164. This eccentric is operatively connected to a pair of plungers or hammers 177 (see Figs. 4 and 7) which are guided in their radial movement by a bracket 178 projecting inwardly from one of the side frames 68. As the hammers or followers 177 are projected radially, they engage the inner ends of the pair of tappets 79 with which they happen to be aligned and project the same rapidly in an outward direction against the action of the springs 81. The tongues 62 of the plates 60 are thus upset between the tappets and the anvils and the wicks 179 (see Fig. 12) securely clamped in place with their lower ends folded over against the under surface of the base plates. Anvils 88 and tappets 79 are simultaneously returned to their normal positions before further movement of the drum occurs. The springs 81 serve to return the tappets after the followers 177 have been retracted by the eccentric 176 and the anvils 88 are again swung downwardly by the aforementioned spring 175.

*Ejecting mechanism.—(Fig. 4.)*

As the wicks and plates approach the under surface of the drum, some of them will fall by gravity from their carrier. In order to insure the positive ejection of any which may remain on the drum through the adherence of the wicks to the tappets or for any other reason, we provide a cam member 180 interiorly of the drum. This member includes a cam face 181 disposed in the path of the inner ends of the tappets. As the drum is rotated, the inner ends of the tappets ride over this face and are projected outwardly. As they reach the end of the cam face, they are quickly retracted by their encircling springs 81, the jar of the collars 82 against the web 78 serving to shake off or dislodge any remaining wicks and plates.

*Operation of the mechanism heretofore described.*

Figure 12:
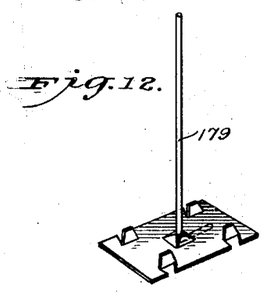
Fig. 12 is a similar view showing a plate and wick assembled.
Figure 13:
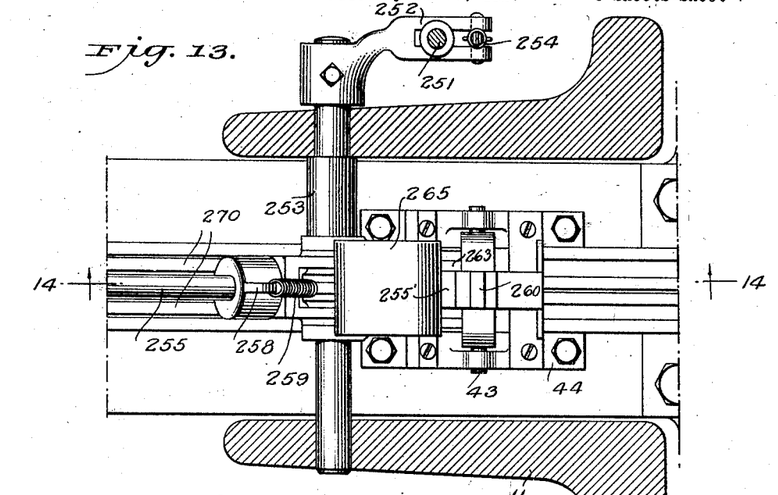
Fig. 13 is a fragmentary plan view of the automatic cut-off mechanism.

Before proceeding with the description of the automatic cut-off mechanism and the description of the details of the wick stock reels, neither of which necessarily form a part of this invention, it is believed advisable to briefly review the operation of the stock feeding, plate and wick forming, assembling and ejecting mechanisms. The two lengths of strip stock are fed between the rollers 37, 38 (Fig. 2) the feed being intermittent and controlled from the main drive shaft of the press. The strips are suitably guided from the rollers to proper position between the male and female die members 30, 31 where they are punched in the desired manner. Passing from beneath the dies, the plates are cut from the strips and drop upon the drum 67. The tampers 69 insure the proper positioning of the plates upon the drum and the proper guiding of the same under the guard 85. The wick stock is fed through these openings and through the central openings in the plate 60 into the interior of the tappets. The wicks are cut off. The feeding of the wick occurs when the wicks are in stationary position and severing of the wicks occurs immediately after the wick feeding operation and just before the drum 67 is moved. Continued movement of the drum brings the wicks and plates into line with the anvils 88. At this point, the tappets are swung outwardly and the anvils swung upwardly to upset the tongues 62 of the plates and crimp the wicks in place, at the same time turning the projecting ends of the wicks flat against the under faces of the plates, as seen in Fig. 12. In the event that the assembled plates and wicks do not drop from the drum as they approach its under surface, the ejector cam 180 co-operates with the inner ends of the tappets in the manner heretofore described to positively shake them off. As the assembled wicks and plates fall from the drum, they may be received in a suitable container (not shown). The change speed mechanism associated with the driving means for the wick feeding rollers makes it possible to feed wicks of any desired size. The gears 149 mounted upon the shaft of the roller 119 are preferably cut so that they may feed standard sized wicks. It is not necessary to provide any means for varying the size of the plates 60. The size of these plates is standard for all sizes and types of candles with which they are used.

*Wick stock reels.*—(*Figs. 15–18, incl.*)

Figure 17:
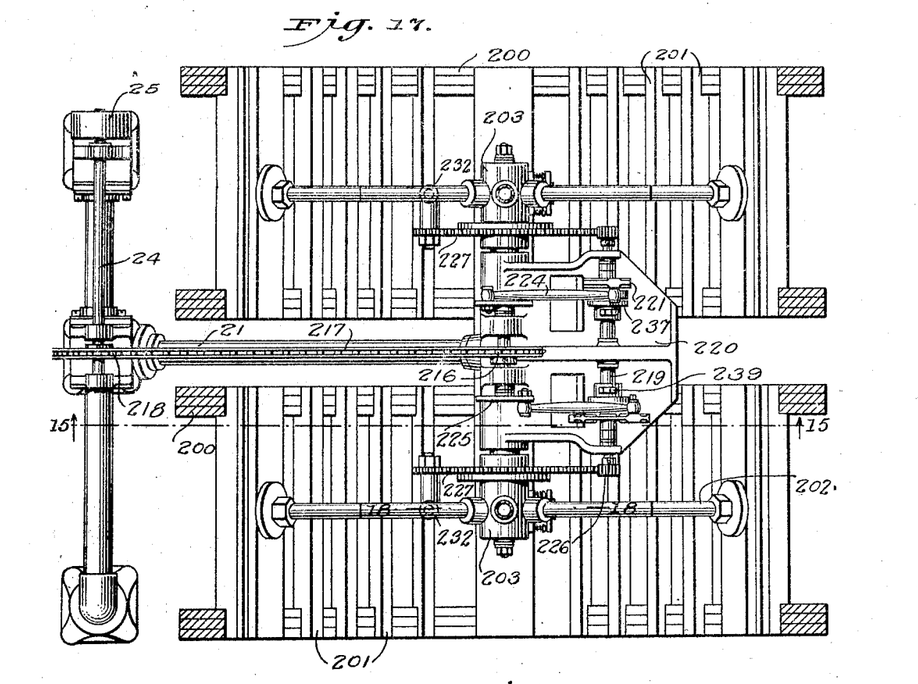
Fig. 17 is a view in transverse section through the two wick stock reels taken on the staggered line 17—17 of Fig. 15.
Figure 18:
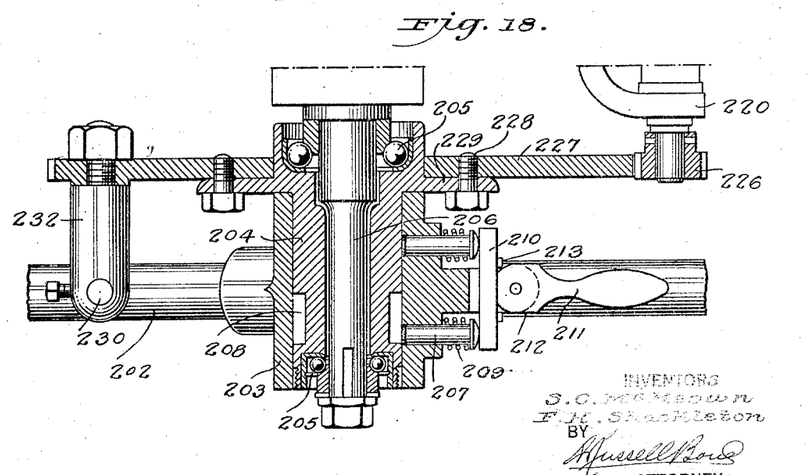
Fig. 18 is an enlarged detail sectional view on the line 18—18 of Fig. 17.

We have provided in connection with our machine two reels upon which are wound two separate lengths of wick stock, having found this to be desirable in connection with a machine in which two plates and wicks are simultaneously assembled. It is not absolutely essential however that two such reels be provided. In any event, the two reels and their associated mechanisms are identical and a description of one will suffice for both. Each reel consists of a pair of rims 200 spaced apart and connected by transverse spaced slats 201. Certain of these slats are of fairly heavy and substantial construction and to the intermediate portion of these, tubular spokes 202 of the reels are attached. These spokes are connected to the reel hub 203 as indicated in Fig. 17. Referring particularly to Fig. 18, it will be noted that the hub 203 turns freely on a sleeve 204 which has anti-friction bearings indicated at 205 upon a spindle 206 fixed to the frame work 21 in any appropriate manner.

The reel hubs 203 are locked against longitudinal movement relative to their supporting sleeves 204 by spring pressed pins or dogs 207 which ride in annular grooves 208 in the sleeves 204. We preferably provide two of such dogs so that the reels may be interchangeable from one spindle to another. One of the dogs is pressed into position in a groove 208 against the action of its associated spring 209 through the intermediacy of a floating rocking plate 210 acted upon by a cam lever 211 (see Fig. 18) provided with a number of flat faces 212 which lock between studs 213 on the plates 210 to securely hold these plates in the desired position. A shaft 214 mounted in a bracket 215 secured to the frame 21 carries a sprocket wheel 216. The wheel 216 is driven by a sprocket chain 217 from a sprocket 218 on the pulley shaft 24, this shaft carrying the pulley 25 as referred to in the initial brief description of the general assemblage of the machine. A short shaft 219 borne by rearward extension 220 of the upper portion of the frame 21 provides mounting for an oscillating plate 221. This plate carries a pair of pawls 222 engageable with the teeth of a ratchet 223 likewise mounted on the shaft 219. Oscillation of the plate 221 to effect turning of the ratchet wheel 223 is accomplished through the medium of a pitman 224 operatively connecting this plate to a disk 225 on the shaft 214. Turning of the ratchet 223 causes turning of a pinion 226 fixed to the shaft 219. This pinion is in mesh with a gear 227 bolted as indicated at 228 to a flange 229 of the sleeve 204 whereon the hub of the reel is supported. We provide a non-positive or shock absorbing driving means between the gear 227 and the spokes 202 of the reel. This has been found necessary because of the considerable inertia which must be overcome when initiating movement of the reel. It is desirable that the reel be moved intermittently to feed the same amount of stock that is used by the wick feeding rollers on the main body of the machine.

Referring for a moment to Fig. 4 of the drawings, it will be noted that the tubular guideways 114, 117 and 155 for the wick are aligned, it being desirable to feed the wick straight into the tappets. The wick in passing from the reel to the guide plate 113 should assume the catenary curve illustrated in Fig. 1. Too much stock in the wick between the reel and the plate 113 will cause a drag on the feeding mechanism and if the feed of the wick to the reel be too slow, the wick will be snapped off and broken. It is highly desirable therefore that some means should be provided for regulating the feed of the wick from the reel in proportion to the length of wick used and also that the drive of the reel should be non-positive.

Figure 16:
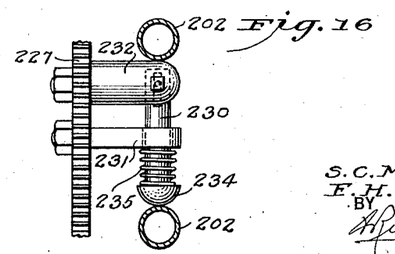
Fig. 16 is a fragmentary detail view of the non-positive bumper mechanism which drives the spokes of the reel.

This non-positive drive is seen most clearly in Fig. 16 where it will be noted that a pin 230 arranged between two of the supports of the reel has sliding movement in a pair of brackets 231, 232 fixed to the gear 227. The head 234 of this pin normally presses against the spoke to be driven but a coiled expansion spring 235 around the pin between the head thereof and the bracket 231 affords a yielding mounting. Sudden jars on the reel caused by operation of the driving mechanism are thus absorbed by the spring 235 and the spokes are intermittently pushed by the pin 234 to effect rotation of the reel.

Figure 15:
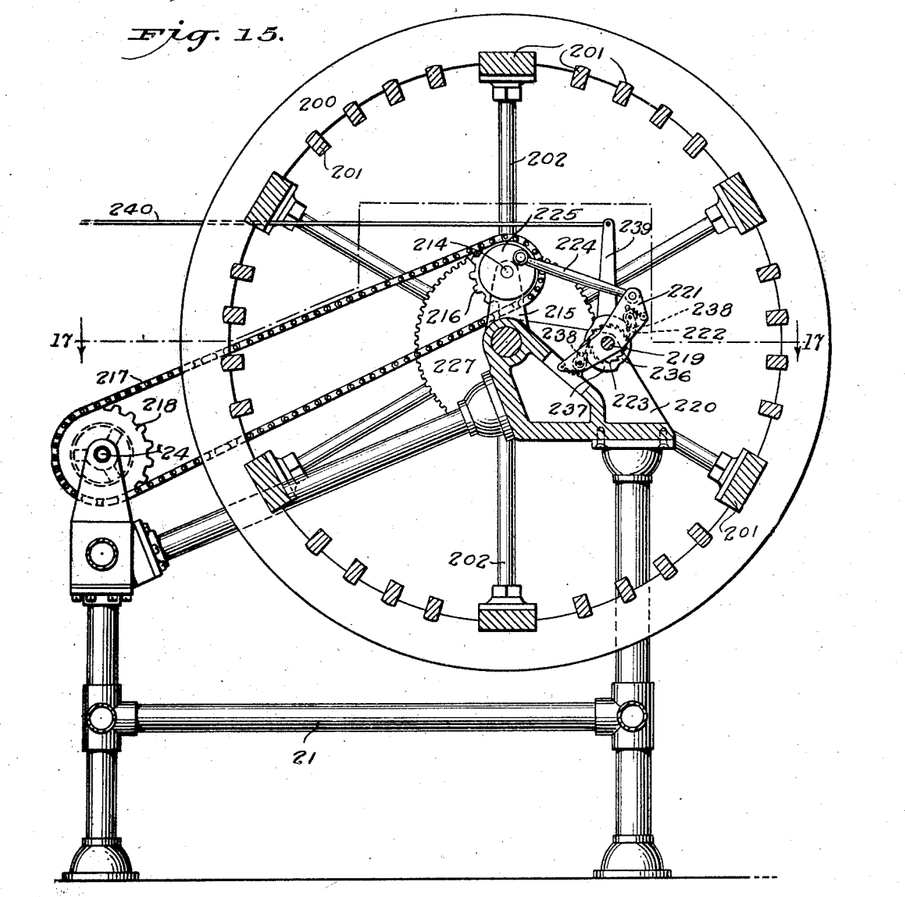
Fig. 15 is an enlarged longitudinal sectional view taken on line 15—15 of Fig. 17 through one of the reels which carries the wick stock, the driving and controlling mechanism for the reel being shown in elevation.

Adjustment of the amount of stock fed from the reel is regulated in the following manner (see Fig. 15). A double acting cam 236 fixed upon the shaft 219 includes extended portions 237 which are engageable with pins 238 projecting laterally from the pawls 222 to hold these pawls out of engagement with their ratchet teeth. In other words when the plate 221 is oscillated, the ratchet 223 will not be turned until the pins 238 have ridden over the extended portions of the cam 236. The extent of turning of the ratchet may therefore be regulated by swinging the cam. The cam is swung by a handle 239 fixed thereto and connected to a rod 240. The end of this rod carries a number of notches 241 (see Fig. 2) in one of which may be selectively interlocked with a pin 242 carried by an upstanding bracket 243 which has mounting on the plate 113. Shifting of the rod 240 to align various notches 241 with the pin 242 will effect a difference in the length of wick fed by the reel upon each oscillation of the driving plate 221.

Operation of the reel.

The operation of the winding reel is briefly as follows: Power is transmitted from the main driving shaft of the punch press through the belt 26 to the pulley 25, thus turning the shaft 24 and through the sprocket chain 217 turning the sprocket 225. As this sprocket is constantly rotated the pitman 224 continually oscillates the plate 221. By virtue, however, of the ratchet and pawl connection between this plate and the shaft 219, the plate is effective to drive the reel only when moved in one direction. The gear 227 is intermittently rotated by the pinion 226, the extent of movement of the gear being controlled by adjusting the cam 236 in the manner described. The bumper pin 230 cushions the transmission of power from the gear 227 to the spokes 202 of the wheel.

Automatic cut-off mechanism.

Figure 14:
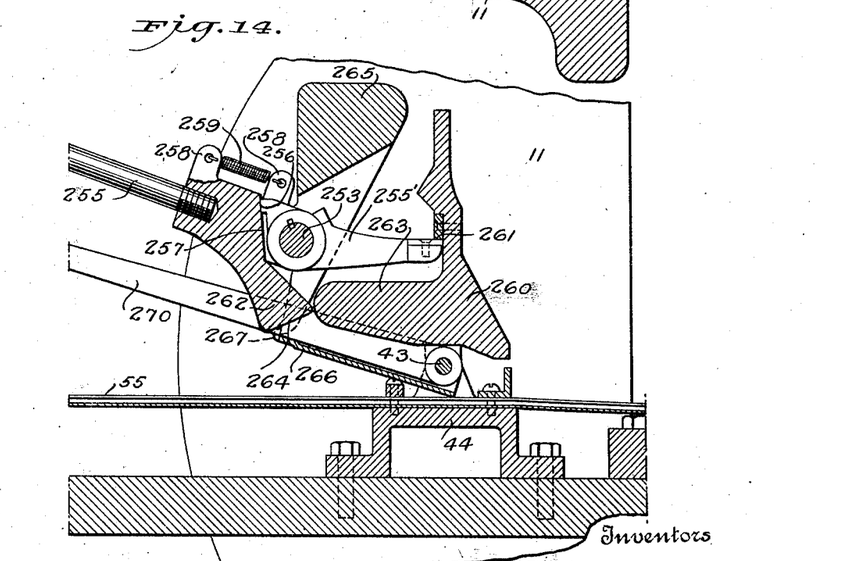
Fig. 14 is a sectional view of such mechanism on the line 14—14 of Fig. 13.

The details of the mechanism which we use for coupling and uncoupling our improved machine and its source of power and for automatically uncoupling the driving mechanism when the strip stock becomes exhausted do not necessarily form part of this invention. For purposes of illustration, however, we have shown one form of automatic cut-off (Figs. 1, 2, 13 and 14) for which we propose to file a separate application for patent. The pulley 13 is connected to the drive shaft 12 through the intermediacy of a conventional type of clutch mechanism. We have not shown details of this mechanism as it forms no part of our invention. We have only invented the means for controlling the clutch. In Fig. 1, reference numeral 250 indicates an arm which when moved upwardly throws out the clutch and which when pulled downwardly throws the clutch in. This arm is connected to a push bar 251 mounted upon a crank arm 252 fixed to a shaft 253 in the press frame. A compression spring 254 acts on the crank arm tending normally to elevate the push rod 251 and arm 250 and throw the clutch out thereby disconnecting the driving mechanism and the press from the motor. Referring with particularity to Fig. 14, it will be noted that the shaft 253 which carries the crank arm 252 also provides pivotal mounting for the end 255' of a handle lever 255. This handle lever is made in two sections, the short pivoted section 255' being provided with a flat face 256 which abuts against a similar face 257 on the main handle section 255. Lugs 258 on the two sections are connected by a contraction spring 259 so that the handle sections ordinarily may be moved as a unit. The spring, however, permits limited movement of the section 255 independently of the section 255' when the short pivoted section is held against movement by a latch plate 260. The latch plate 260 is pivoted upon a shaft 43 arranged in a bracket 44 on the table of the press and includes a forwardly presented lip 261 under which the extremity of the handle section 255' is adapted to engage to prevent movement of this section in one direction. A pair of relatively heavy levers 270 are also pivoted on the shaft 43 and terminate in curved or hooked ends provided at their extremities with presser feet 271 which normally rest upon the strip stock just before it reaches the feeding mechanism. A trip plate 266 swinging on the pivot 43 is urged upwardly into engagement with the under sides of the levers 270 by coiled springs 268 (see Fig. 2). The trip plate 266 adjacent its free end is formed with a pair of hooks 267 normally engageable with the heels of a counter weight 265 which is pivoted on the shaft 253 to hold said counter weight in the substantially vertical position illustrated in Fig. 14. A lug or extension 262 integral with the handle section 255 is provided with a cam face 264 adapted to act on the hooks 267 for the purpose of depressing the trip plate 266 and releasing the counter weight 265. This counter weight will fall gravitationally against the latch plate 260 rocking the same about its pivot, consequently releasing the end of the handle section 255' from its engagement with the lip 261 and permitting the spring 254 (Fig. 1) to act through the push rod 251 and clutch arm 250 to throw out the clutch. In the event that the cam 264 should fail to act on the hooks 267, the extension 262 will engage with an extension 263 on the trip plate to positively effect rocking of the trip plate and consequent release of the handle section 255' regardless of the position of the counter weight. The parts are re-set by hand when it is desired to start operation of the machine. It is very evidently desirable to stop operation of the machine whenever the strip stock becomes exhausted. When this occurs, the absence of the stock under the presser feet 271 will permit these feet to drop into holes provided for their accommodation in the bracket 35 whereby the levers 270 will fall by gravity, moving the trip plate 266 to inoperative position, allowing the counter weight 265 to fall against the latch plate 260 releasing the member 255' and permitting throwing out of the clutch in the manner above described.

Although we have illustrated one of the preferred embodiments of the invention, it will be obvious that numerous slight changes and alterations might be made in the general form and arrangement of the parts described without departing from the invention, and hence we do not wish to limit ourselves to the precise details set forth, but shall consider ourselves at liberty to make such changes and alterations as fairly fall within the spirit and scope of the appended claims.

We claim:

1. In a machine of the class described, means for forming candle base plates with wick receiving openings therein, means for inserting wicks in the openings, and means for clamping wicks in the openings.

2. In a machine of the class described, means for feeding strip metal stock, means for forming candle base plates and severing the same from the stock, and means for attaching wicks to the formed base plates.

3. In a machine of the class described, means for feeding strip metal stock, means for forming candle base plates and severing the same from the stock, means for feeding wick stock, and means for severing wicks from the stock and attaching the same to the base plates.

4. In a machine of the class described, a plate forming mechanism, a mechanism for cutting wicks from stock, and means for attaching the formed plates to the cut wicks.

5. In a machine of the class described, means for feeding strip metal stock, means for forming base plates from the stock with wick receiving openings therein, means for passing the wicks through the openings in the plates, and means for crimping the plates on the wicks.

6. In a machine of the class described, a movable plate carrier, a wick feeding mechanism, means for passing the wicks through the plates on the carrier, and means for assembling the wicks and plates.

7. In a machine of the class described, a movable plate carrier, a wick feeding mechanism, means for passing the wicks through the plates on the carrier, and means associated with the carrier for crimping the plates on the wicks.

8. In a machine of the class described, a movable plate carrier, a wick feeding mechanism, means for passing the wicks through the plates on the carrier, a co-operating anvil, and a hammer for crimping the wicks in the plates.

9. In a machine of the class described, an intermittently movable plate carrier, a wick feeding mechanism, means for passing the wicks through the plates on the carrier, and means for assembling the wicks and plates.

10. In a machine of the class described, an intermittently movable plate carrier, a wick feeding mechanism, means for passing the wicks through the plates on the carrier, and means associated with the carrier for crimping the plates on the wicks when the carrier is in stationary position.

11. In a machine of the class described, an intermittently movable plate carrier, a wick feeding mechanism, means for passing the wicks through the plates on the carrier, and a co-operating anvil and hammer operable when the carrier is in stationary position to clamp the wick in the plate.

12. In a machine of the class described, a movable plate carrying drum, a wick feeding mechanism, means for passing the wicks through the plates on the drum, and means for assembling the wicks and plates.

13. In a machine of the class described, a movable plate carrying drum, a wick feeding mechanism, means for passing the wicks through the plates on the drum, and means associated with the drum for crimping the plates on the wick.

14. In a machine of the class described, a movable plate carrying drum, a wick feeding mechanism, means for passing the wicks through the plates on the drum, and a co-operating anvil and hammer associated with the drum for crimping the plates on the wicks.

15. In a machine of the class described, an intermittently movable plate carrying drum, a wick feeding mechanism, means for passing the wicks through the plates on the drum, and means for assembling the wicks and plates.

16. In a machine of the class described, an intermittently movable plate carrying drum, a wick feeding mechanism, means for passing the wicks through the plates on the drum, and means associated with the drum for crimping the plates on the wick.

17. In a machine of the class described, an intermittently movable plate carrying drum, a wick feeding mechanism, means for passing the wicks through the plates on the drum, and a co-operating anvil and hammer for crimping the plates on the wick.

18. In a machine of the class described, an intermittently movable plate carrier, an intermittently operable wick feeding mechanism adapted to pass the wicks through the plates on the carrier when the carrier is in stationary position, and means for attaching the plates to the wicks.

19. In a machine of the class described, an intermittently movable plate carrier, an intermittently operable wick feeding mechanism adapted to pass the wicks through the plates on the carrier when the carrier is in stationary position, and means associated with the carrier for attaching the plates to the wicks.

20. In a machine of the class described, an intermittently movable plate carrier, an intermittently operable wick feeding mechanism adapted to pass the wicks through the plates on the carrier when the carrier is in stationary position, and a co-operating anvil and hammer for attaching the plates to the wicks.

21. In a machine of the class described, an intermittently movable plate carrying drum, an intermittently movable wick feeding mechanism, means for passing the wicks through the plates on the drum, and means for attaching the plates to the wicks.

22. In a machine of the class described, an intermittently movable plate carrying drum, an intermittently movable wick feeding mechanism, means for passing the wicks through the plates on the drum, and means operable in conjunction with the carrier for crimping the plates on the wicks.

23. In a machine of the class described, an intermittently movable plate carrying drum, an intermittently movable wick feeding mechanism, means for passing the wicks through the plates on the drum, and a co-operating anvil and hammer for crimping the wicks on the plates when the drum is in stationary position.

24. In a machine of the class described, an intermittently movable plate carrying drum, tappets borne by the drum, means for feeding wicks through the plates on the drum, and means co-operable with the tappets for crimping the plates to the wicks.

25. In a machine of the class described, an intermittently movable plate carrying drum, tappets borne by the drum, means for feeding wicks through the plates on the drum, and means co-operable with the tappets for crimping the plates to the wicks, said wick feeding mechanism being operable when the drum is in stationary position.

26. In a machine of the class described, an intermittently movable plate carrying drum, tappets borne by the drum, means for feeding wicks through the plates on the drum, and means co-operable with the tappets for crimping the plates to the wicks, said crimping mechanism being operable when the drum is in stationary position.

27. In a machine of the class described, an intermittently movable plate carrying drum, tappets borne by the drum, a wick feeding mechanism operable to pass wicks through the plates on the carrier, and an anvil adapted to co-operate with any of the tappets for crimping the plates on the wicks.

28. In a machine of the class described, an intermittently movable plate carrying drum, tappets borne by the drum, a wick feeding mechanism operable to pass wicks through the plates on the carrier, and an anvil adapted to co-operate with any of the tappets for crimping the plates on the wicks, said tappets and anvil being simultaneously operable when the drum is in stationary position.

29. In a machine of the class described, an intermittently movable plate carrying drum, tappets borne by the drum, a wick feeding mechanism operable to pass wicks through the plates on the carrier, and an anvil adapted to co-operate with any of the tappets for crimping the plates on the wicks, said wick feeding mechanism being operable when the drum is in stationary position.

30. In a machine of the class described, an intermittently movable plate carrying drum, tappets borne by the drum, a wick feeding mechanism operable to pass wicks through the plates on the carrier, and an anvil adapted to co-operate with any of the tappets for crimping the plates on the wicks, said wick feeding mechanism being operable when the drum is in stationary position, said tappets and anvil being operable after the drum has moved the plates past the wick feeding mechanism.

31. In a machine of the class described, a plate carrier, mechanism for feeding wicks through the plates on the carrier mechanism, means for attaching the plates and wicks, and mechanism for dislodging the attached plates and wicks from the carrier.

32. A machine of the class described including a plate carrying drum, radially disposed hollow tappets borne by the drum, and aligned with the plates, means for passing wicks through the plates and into the tappets, means co-operating with the tappets for attaching the plates to the wicks, and means acting on the tappets to dislodge the assembled plates and wicks from the drum.

33. In a machine of the class described, a plate forming mechanism, an intermittently movable carrier upon which the formed plates are deposited, a wick feeding mechanism arranged adjacent the carrier and operable to insert wicks through the plates after they are moved by the carrier into alignment with said mechanism.

34. In a machine of the class described, a plate forming mechanism, an intermittently movable carrier upon which the formed plates are deposited, a wick feeding mechanism arranged adjacent the carrier and operable to insert wicks through the plates after they are moved by the carrier into alignment with such mechanism, and mechanism associated with the carrier for crimping the plates on the wicks.

35. In a machine of the class described, a plate forming mechanism, an intermittently movable carrier upon which the formed plates are deposited, a wick feeding mechanism arranged adjacent the carrier and operable to insert wicks through the plates as they are moved by the carrier into alignment with such mechanism, and mechanism associated with the carrier for crimping the plates on the wicks, said crimping mechanism and wick feeding mechanism being simultaneously operable.

36. In a machine of the class described, a plate forming mechanism, an intermittently movable carrier upon which the formed plates are deposited, a wick feeding mechanism arranged adjacent the carrier and operable to insert wicks through the plates as they are moved by the carrier into alignment with such mechanism, and mechanism associated with the carrier for crimping the plates on the wicks, said crimping mechanism and wick feeding mechanism being simultaneously operable while the carrier is stationary.

37. In a machine of the class described, a plate carrier, a wick feeding mechanism operable to feed wick stock through the plates on the carrier, means for severing the wicks from the stock after the stock has been fed through the plates, and means for varying the amount of stock fed upon each operation of the wick feeding mechanism, said last mentioned means comprising driving mechanism for the wick feeding means and a change speed gear associated with said driving mechanism.

38. In a machine of the class described, a plate carrier, a plurality of wick feeding rollers, guide tubes for the wick stock extending between the rollers, and means for severing wicks from the stock after they have passed through the rollers and said plates.

39. In a machine of the class described, a plate carrier, wick feeding mechanism arranged adjacent thereto and including a plurality of wick feeding rollers and a plurality of aligned tubes for guiding the wick stock between said rollers and through said plates.

40. In a machine of the class described, a plate carrying drum, a plurality of radially disposed hollow tappets borne by said drum and adapted to be projected radially outwardly through the periphery of said drum, means for passing wicks through the plates and into said tappets, means for attaching the plates to the wicks, and means in the path of the inner ends of the tappets for causing the tappets to move gradually outwardly and be suddenly retracted inwardly whereby to dislodge the assembled plates and wicks from the tappets.

41. In a machine of the class described, a plate forming mechanism, a plate carrying drum, means for depositing formed plates upon the drum, a guard concentric with the drum under which said plates are adapted to be carried, and means associated with the forming mechanism for holding said plates firmly against the drum until they are passed under the guard by turning of the drum.

42. In a machine of the class described, a plate forming mechanism, a plate carrying drum, means for depositing formed plates upon the drum, a guard concentric with the drum under which said plates are adapted to be carried, and means associated with the forming mechanism for holding said plates firmly against the drum until they are passed under the guard by turning of the drum, said holding mechanism comprising a yieldingly mounted tamper.

43. In a machine of the class described, a plate carrier, a wick stock feeding mechanism arranged adjacent thereto, a wick stock reel, means for intermittently driving both the reel and the feeding mechanism, and means for varying the amount of stock delivered from the reel and the amount of stock fed by the feeding mechanism.

44. In a machine of the class described, a reel for carrying wick stock, means for intermittently operating the reel to deliver stock therefrom, a plate carrier, means for severing wicks from the stock, and means for attaching plates on the carrier to the severed wicks.

45. In a machine of the class described, a reel for carrying wick stock, means for intermittently operating the reel to deliver stock therefrom, a plate carrier, means for severing wicks from the stock, means for attaching plates on the carrier to the severed wicks, and means for varying the amount of wick delivered at each operation of the reel.

46. In a machine of the class described, a plate forming mechanism, an intermittently movable reel for carrying wick stock, a wick feeding mechanism arranged between the reel and the plate forming mechanism, means for varying the amount of wick delivered from the reel at each operation thereof, and means for varying the amount of stock fed by the feeding mechanism whereby a constant amount of slack is maintained in the stock between the reel and the feeding mechanism.

47. In a machine of the class described, means for feeding strip stock, means for forming base plates from the stock, means for cutting wicks from stock, means for assembling the wicks and base plates, driving means for all of said means, and means for automatically disconnecting the driving means when the strip stock becomes exhausted.

48. In a machine of the class described, a plate forming mechanism, means for feeding strip stock to the plate forming mechanism, and means for rendering the forming mechanism inoperative when the strip stock has become nearly exhausted.

49. In a machine of the class described, plate forming mechanism, plate carrying mechanism, wick feeding mechanism, wick severing mechanism, mechanism for attaching the formed plates to the severed wicks, and means for ejecting the assembled wicks and plates from the carrying mechanism.

SAMUEL C. McKEOWN.
FRED H. SHACKLETON.